US012027090B2

(12) United States Patent
Hwang

(10) Patent No.: US 12,027,090 B2
(45) Date of Patent: Jul. 2, 2024

(54) GATE DRIVING CIRCUIT AND DISPLAY APPARATUS INCLUDING THE SAME

(71) Applicant: Samsung Display Co., Ltd., Yongin-Si (KR)

(72) Inventor: Junghwan Hwang, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/092,402

(22) Filed: Jan. 2, 2023

(65) Prior Publication Data

US 2023/0145013 A1 May 11, 2023

Related U.S. Application Data

(63) Continuation of application No. 17/143,207, filed on Jan. 7, 2021, now Pat. No. 11,568,776.

(30) Foreign Application Priority Data

Apr. 9, 2020 (KR) ........................ 10-2020-0043285

(51) Int. Cl.
*G09G 5/00* (2006.01)
*G09G 3/20* (2006.01)

(52) U.S. Cl.
CPC ....... *G09G 3/20* (2013.01); *G09G 2300/0413* (2013.01); *G09G 2310/0275* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 9,064,466 | B2 | 6/2015 | Lin et al. | |
| 10,360,863 | B2 | 7/2019 | Hwang et al. | |
| 10,460,691 | B2 | 10/2019 | Wang et al. | |
| 10,733,950 | B2 | 8/2020 | Hwang et al. | |
| 10,748,471 | B2 | 8/2020 | Hwang | |
| 2010/0277206 | A1* | 11/2010 | Lee ...................... | G11C 19/184 327/108 |
| 2011/0273417 | A1 | 11/2011 | Shin et al. | |
| 2012/0038616 | A1 | 2/2012 | Song et al. | |
| 2012/0105398 | A1 | 5/2012 | Park et al. | |
| 2012/0293467 | A1* | 11/2012 | Lee ...................... | G09G 3/3677 345/204 |
| 2014/0340294 | A1 | 11/2014 | Ocihai et al. | |
| 2014/0354523 | A1 | 12/2014 | So et al. | |
| 2015/0371598 | A1 | 12/2015 | So et al. | |
| 2018/0096645 | A1 | 4/2018 | Lee et al. | |

(Continued)

FOREIGN PATENT DOCUMENTS

KR 10-1407307 B1 6/2014

*Primary Examiner* — Carl Adams
(74) *Attorney, Agent, or Firm* — Innovation Counsel LLP

(57) ABSTRACT

A gate driver includes a plurality of active stages and a plurality of dummy stages. The active stage is configured to output a plurality of gate signals to a display region. The dummy stage is c connected to respective active stages and configured to output a plurality of dummy carry signals to the respective active stages. The active stage is configured to output the plurality of gate signals and a plurality of active carry signals. The plurality of dummy stages are configured to output the plurality of dummy carry signals, respectively, and not to output any gate signal.

19 Claims, 14 Drawing Sheets

(56) References Cited

U.S. PATENT DOCUMENTS

| | | | |
|---|---|---|---|
| 2020/0066224 | A1 | 2/2020 | Hwang et al. |
| 2020/0251066 | A1 | 8/2020 | Hu et al. |
| 2021/0183318 | A1 | 6/2021 | Kim et al. |
| 2021/0304660 | A1 | 9/2021 | Maruyama et al. |

* cited by examiner

FIG. 9

| AST | | DST | |
|---|---|---|---|
| TR | um | TR | um |
| w1 | 3198 | w1 | 160 |
| w2 | 5330 | w2 | 100 |
| w3 | 220 | w3 | 39 |
| w4 | 1418 | w4 | 252 |
| w6 | 700 | w6 | 100 |
| w10 | 291 | w10 | 52 |
| w11 | 230 | w11 | 230 |
| w15 | 900 | w15 | 160 |
| | | w18 | 100 |
| | | w19 | 15 |
| C(fF) | 8800 | C(fF) | 3000 |

GATE DRIVING CIRCUIT AND DISPLAY APPARATUS INCLUDING THE SAME

PRIORITY STATEMENT

This application is a continuation application of U.S. patent application Ser. No. 17/143,207 filed on Jan. 7, 2021, which claims priority under 35 U.S.C. § 119 to Korean Patent Application No. 10-2020-0043285, filed on Apr. 9, 2020, in the Korean Intellectual Property Office KIPO, the contents of which are herein incorporated by reference in their entireties.

BACKGROUND

1. Field

Example embodiments of the present inventive concept relate to a gate driving circuit and a display apparatus including the gate driving circuit. More particularly, example embodiments of the present inventive concept relate to a gate driving circuit for reducing a dead space of a display apparatus by reducing an area occupied by the gate driving circuit and a fan out area of gate lines and a display apparatus including the gate driving circuit.

2. Description of the Related Art

Generally, a display apparatus includes a display panel and a display panel driver. The display panel includes a plurality of gate lines and a plurality of data lines. The display panel driver includes a gate driver and a data driver. The gate driver outputs gate signals to the gate lines. The data driver outputs data voltages to the data lines.

The gate driver may output the gate signals using a plurality of stages integrated on the display panel. The gate driver may include an active stage outputting the gate signal to the display panel and a dummy stage not outputting the gate signal to the display panel. Due to a mounted area of the dummy stage, the dead space of the display apparatus may be increased. In addition, due to the mounted area of the dummy stage, a fan out area of the gate lines may be increased.

SUMMARY

Example embodiments of the present inventive concept provide a gate driving circuit reducing a dead space of a display apparatus.

Example embodiments of the present inventive concept also provide a display apparatus including the gate driving circuit.

In an example embodiment of a gate driving circuit according to the present inventive concept, the gate driving circuit includes a plurality of active stages and a plurality of dummy stages. The active stage is configured to output a plurality of gate signals to a display region. The dummy stage is connected to respective active stage and configured to output a plurality of dummy carry signals to the respective active stages. The plurality of active stages are configured to output the plurality of gate signals and a plurality of active carry signals, respectively. The plurality of dummy stages are configured to output the plurality of dummy carry signals, respectively, and not to output any gate signal.

In an example embodiment, the dummy stage may include a pull-up control part configured to apply a previous carry signal of one of previous stages to a first node in response to the previous carry signal, a first holding part configured to pull down the first node to a second off voltage in response to a vertical start signal, a pull-up part configured to apply a first clock signal to a second node in response to a signal of the first node and a pull-down part configured to pull down the second node to a first off voltage in response to the vertical start signal.

In an example embodiment, the dummy stage may further include a carry part configured to output the first clock signal as an N-th carry signal in response to the signal of the first node, a second holding part configured to pull down the second node to the first off voltage in response to a second clock signal, a third holding part configured to connect the first node to a carry output terminal in response to the first clock signal and a fourth holding part configured to pull down the carry output terminal to the second off voltage in response to the second clock signal.

In an example embodiment, the dummy stage may further include a carry pull-down part configured to pull down the carry output terminal to the second off voltage in response to the vertical start signal and a self-erasing part configured to pull down the first node to the second off voltage.

In an example embodiment, a control electrode of the self-erasing part may be connected to the second node.

In an example embodiment, a control electrode of the self-erasing part may be connected to the carry output terminal.

In an example embodiment, first, second, third, fourth, fifth, sixth, seventh, eighth, ninth, tenth, eleventh and twelfth clock timing signals having different phases may be applied to the gate driving circuit. The first, second, third, fourth, fifth, sixth, seventh, eighth, ninth, tenth, eleventh and twelfth clock timing signals may be sequentially activated at a same interval. When the first clock signal may be the eighth clock timing signal, the second clock signal is the first clock timing signal.

In an example embodiment, the dummy stage may include a pull-up control part configured to apply a first previous carry signal of one of previous stages to a first node in response to the first previous carry signal, a first holding part configured to pull down the first node to a second off voltage in response to a vertical start signal, a pull-up part configured to apply a first clock signal to a second node in response to a signal of the first node and a pull-down part configured to pull down the second node to a first off voltage in response to a second previous carry signal of one of previous stages, the second previous carry signal being different from the first previous carry signal.

In an example embodiment, the dummy stage may further include a carry part configured to output the first clock signal as an N-th carry signal in response to the signal of the first node, a second holding part configured to pull down the second node to the first off voltage in response to a second clock signal, a third holding part configured to connect the first node to a carry output terminal in response to the first clock signal and a fourth holding part configured to pull down the carry output terminal to the second off voltage in response to the second clock signal.

In an example embodiment, the dummy stage may further include a carry pull-down part configured to pull down the carry output terminal to the second off voltage in response to the second previous carry signal and a self-erasing part configured to pull down the first node to the second off voltage.

In an example embodiment, first, second, third, fourth, fifth, sixth, seventh, eighth, ninth, tenth, eleventh and twelfth clock timing signals having different phases may be applied to the gate driving circuit. The phases of the first, second, third, fourth, fifth, sixth, seventh, eighth, ninth, tenth, eleventh and twelfth clock timing signals may be sequentially activated at a same interval. When the first clock signal is the fourth clock timing signal, the second clock signal may be the tenth clock timing signal, the first previous carry signal may have a same phase as the tenth clock timing signal and the second previous carry signal may have a same phase as the seventh clock timing signal.

In an example embodiment, the active stage may include an active pull-up part configured to output an active clock signal as an N-th gate signal and an active pull-down part configured to pull down a gate output terminal to a first off voltage in response to a carry signal of one of next stages. The dummy stage may include a dummy pull-up part configured to apply a dummy clock signal to a second node and a dummy pull-down part configured to pull down the second node to a first off voltage in response to a vertical start signal. A channel width of a transistor of the dummy pull-up part may be less than a channel width of a transistor of the active pull-up part. A channel width of a transistor of the dummy pull-down part may be less than a channel width of a transistor of the active pull-down part.

In an example embodiment, the active stage may further include an active capacitor connected to a control electrode of the active pull-up part and an output electrode of the active pull-up part. The dummy stage may further include a dummy capacitor connected to a control electrode of the dummy pull-up part and an output electrode of the dummy pull-up part. A capacitance of the dummy capacitor may be less than a capacitance of the active capacitor.

In an example embodiment of a gate driving circuit according to the present inventive concept, the gate driving circuit includes a plurality of active stages and a plurality of dummy stages. The active stage is configured to output a plurality of gate signals to a display region. The plurality of dummy stages are connected to respective active stages and configured to output carry signals to the respective active stages. One of the plurality of dummy stages is configured to output carry signals to at least two active stages.

In an example embodiment, the gate driving circuit may include a first dummy stage configured to output a carry signal to two active stages, a second dummy stage configured to output a carry signal to two active stages, a third dummy stage configured to output a carry signal to two active stages and a fourth dummy stage configured to output a carry signal to two active stages.

In an example embodiment, first, second, third, fourth, fifth, sixth, seventh, eighth, ninth, tenth, eleventh and twelfth clock timing signals having different phases may be applied to the gate driving circuit. The phases of the first, second, third, fourth, fifth, sixth, seventh, eighth, ninth, tenth, eleventh and twelfth clock timing signals may be sequentially activated at a same interval. The first dummy stage may be configured to generate a first dummy carry signal in response to the second clock timing signal and output the first dummy carry signal to a fifth active stage receiving the fifth clock timing signal and a sixth active stage receiving the sixth clock timing signal. The second dummy stage may be configured to generate a second dummy carry signal in response to the fourth clock timing signal and output the second dummy carry signal to a seventh active stage receiving the seventh clock timing signal and an eighth active stage receiving the eighth clock timing signal. The third dummy stage may be configured to generate a third dummy carry signal in response to the sixth clock timing signal and output the third dummy carry signal to a ninth active stage receiving the ninth clock timing signal and a tenth active stage receiving the tenth clock timing signal. The fourth dummy stage may be configured to generate a fourth dummy carry signal in response to the eighth clock timing signal and output the fourth dummy carry signal to an eleventh active stage receiving the eleventh clock timing signal and a twelfth active stage receiving the twelfth clock timing signal.

In an example embodiment, the gate driving circuit may include a first dummy stage configured to output a carry signal to four active stages and a second dummy stage configured to output a carry signal to four active stages.

In an example embodiment, first, second, third, fourth, fifth, sixth, seventh, eighth, ninth, tenth, eleventh and twelfth clock timing signals having different phases may be applied to the gate driving circuit. The phases of the first, second, third, fourth, fifth, sixth, seventh, eighth, ninth, tenth, eleventh and twelfth clock timing signals may be sequentially activated at a same interval. The first dummy stage may be configured to generate a first dummy carry signal in response to the fourth clock timing signal and output the first dummy carry signal to a fifth active stage receiving the fifth clock timing signal, a sixth active stage receiving the sixth clock timing signal, a seventh active stage receiving the seventh clock timing signal and an eighth active stage receiving the eighth clock timing signal. The second dummy stage may be configured to generate a second dummy carry signal in response to the eighth clock timing signal and output the second dummy carry signal to a ninth active stage receiving the ninth clock timing signal, a tenth active stage receiving the tenth clock timing signal, an eleventh active stage receiving the eleventh clock timing signal and a twelfth active stage receiving the twelfth clock timing signal.

In an example embodiment of a display apparatus according to the present inventive concept, the display apparatus includes a display panel, a data driving circuit and a gate driving circuit. The display panel includes a display region configured to display an image and a peripheral region disposed adjacent to the display region. The data driving circuit is configured to apply a data voltage to the display panel. The gate driving circuit includes a plurality of active stages and a plurality of dummy stages. The plurality of active stages are configured to output a plurality of gate signals to the display region. The plurality of dummy stage are connected to respective active stages and configured to output dummy carry signals to the respective active stages. The plurality of active stage are configured to output the plurality of gate signals and a plurality of active carry signals. The dummy plurality of dummy stages are configured to output the dummy carry signals and not to output any gate signal.

In an example embodiment, one of the dummy stages may be configured to output the carry signal to at least two active stages.

According to the gate driving circuit and the display apparatus, the dummy stage outputs the carry signal but does not output the gate signal so that the channel width of the transistor of the dummy stage may be decreased and the capacitance of the capacitor of the dummy stage may be decreased. Thus, the mounted area of the dummy stage is reduced so that the dead space of the display apparatus may be reduced. In addition, the dummy stage does not output the gate signal so that an area for wirings for outputting the gate signals of the dummy stages may not be required, and accordingly the dead space of the display apparatus may be reduced.

Furthermore, the carry signal of one dummy stage may be outputted to the plural active stages. Since the plural active stages share the carry signal of the one dummy stage, the number of the dummy stages may be reduced. In this case, the fan out area of the gate lines for outputting the gate signals from the active stages to the active area of the display panel may also be reduced. Therefore, the dead space of the display apparatus may be reduced.

BRIEF DESCRIPTION OF THE DRAWINGS

The above and other features and advantages of the present inventive concept will become more apparent by describing in detailed example embodiments thereof with reference to the accompanying drawings, in which:

FIG. 9 is a table illustrating examples of channel widths of transistors and capacitances of capacitors of the active stage and the dummy stage of the gate driver of FIG. 1;

DETAILED DESCRIPTION OF THE INVENTIVE CONCEPT

Hereinafter, the present inventive concept will be explained in detail with reference to the accompanying drawings.

Figure 1:
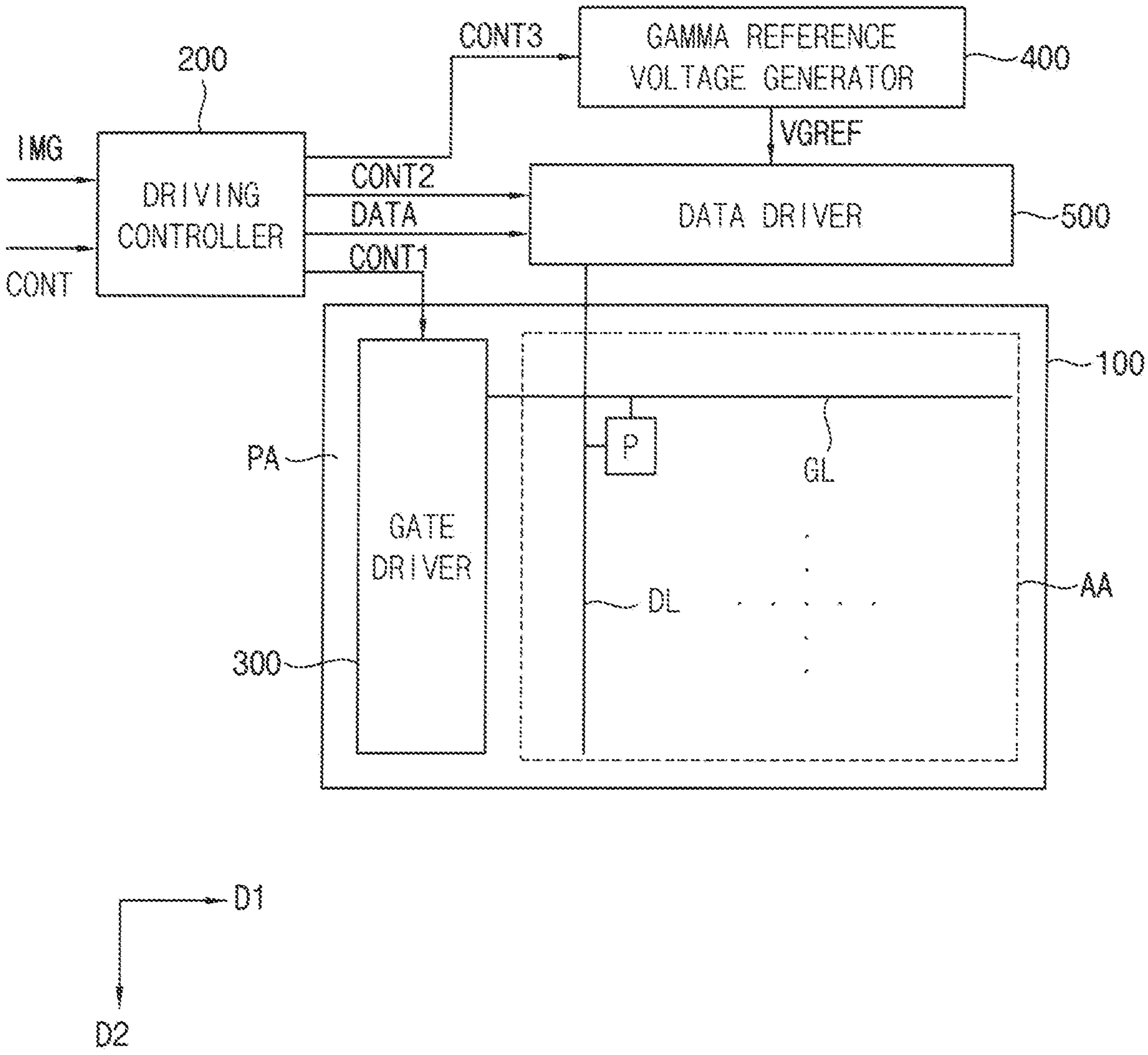
FIG. 1 is a block diagram illustrating a display apparatus according to an example embodiment of the present inventive concept.

FIG. 1 is a block diagram illustrating a display apparatus according to an example embodiment of the present inventive concept.

Referring to FIG. 1, the display apparatus includes a display panel 100 and a display panel driver. The display panel driver includes a driving controller 200, a gate driver 300, a gamma reference voltage generator 400 and a data driver 500.

The driving controller 200 and the data driver 500 may be integrally formed. The driving controller 200, the gamma reference voltage generator 400 and the data driver 500 may be integrally formed. A driving module including at least the driving controller 200 and the data driver 500 which are integrally formed may be called to a timing controller embedded data driver (TED).

The display panel 100 has a display region AA on which an image is displayed and a peripheral region PA disposed adjacent to the display region AA.

The display panel 100 includes a plurality of gate lines GL, a plurality of data lines DL and a plurality of pixels connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT 1 received from the driving controller 200. The gate driver 300 outputs the gate signals to the gate lines GL. For example, the gate driver 300 may sequentially output the gate signals to the gate lines GL.

In the present example embodiment, the gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an example embodiment, the gamma reference voltage generator 400 may be disposed in the driving controller 200, or in the data driver 500.

The data driver 500 receives the second control signal CONT2 and the data signal DATA from the driving controller 200 and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
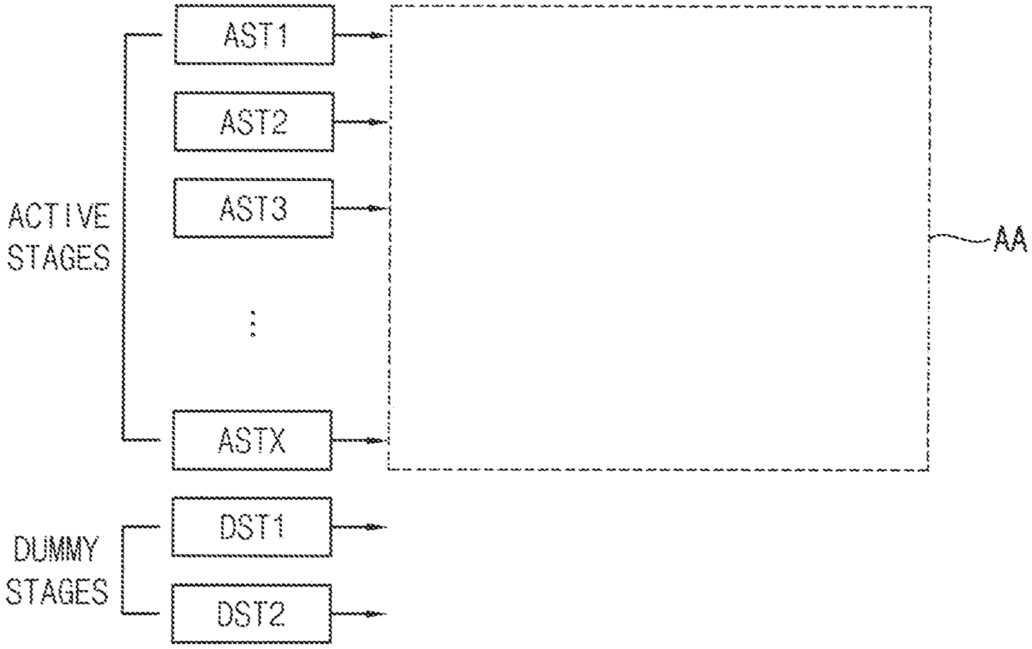
FIG. 2 is a block diagram illustrating a gate driver of FIG. 1.

FIG. 2 is a block diagram illustrating the gate driver 300 of FIG. 1.

Referring to FIGS. 1 and 2, the gate driver 300 includes a plurality of active stages AST1 to ASTX and a plurality of dummy stages DST1 and DST2.

The active stages AST1 to ASTX outputs the gate signals to the gate lines in the active region AA. For example, the number of the active stages AST1 to ASTX may be equal to the number of the gate lines in the active region AA of the display panel 100. For example, the number of the active stages AST1 to ASTX may be equal to the number of pixel rows of the active region AA of the display panel 100.

Each of the active stages AST1 to ASTX may output the gate signal and a carry signal.

The dummy stages DST1 and DST2 may be connected to the active stages and may output the carry signal to the active stages. For example, the dummy stages DST1 and DST2 may be connected to some of the active stages AST1 to ASTX and may output the carry signal to the some of the active stages AST1 to ASTX.

Each of the dummy stages DST1 to DST2 may output the carry signal and may not output the gate signal. Conventionally in order not to affect the waveform of the gate signals of the active stages AST1 to ASTX, the dummy stages DST1 and DST2 are configured to output the gate signals and the carry signals like the active stages AST1 to ASTX.

In the present example embodiment, the dummy stages DST1 and DST2 output the carry signals and do not output the gate signals so that an area for gate signal wirings of the dummy stages may not be required. Accordingly, a space for forming the gate signal wirings in the display apparatus may be saved. In the present example embodiment, in order not to affect the waveform of the gate signals, timings of input signals and configuration of transistors in the dummy stages may be optimized.

Figure 3:
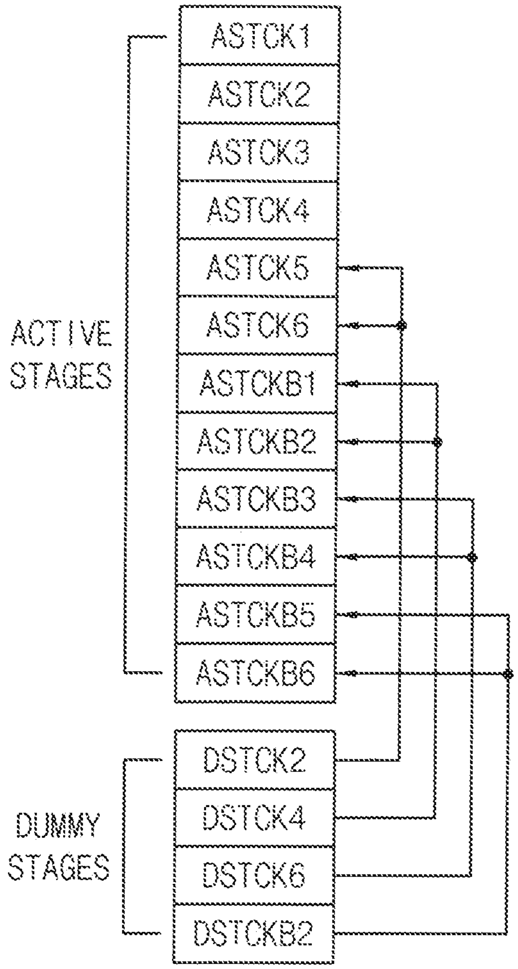
FIG. 3 is a block diagram illustrating an end portion of the gate driver of FIG. 1.
Figure 4:
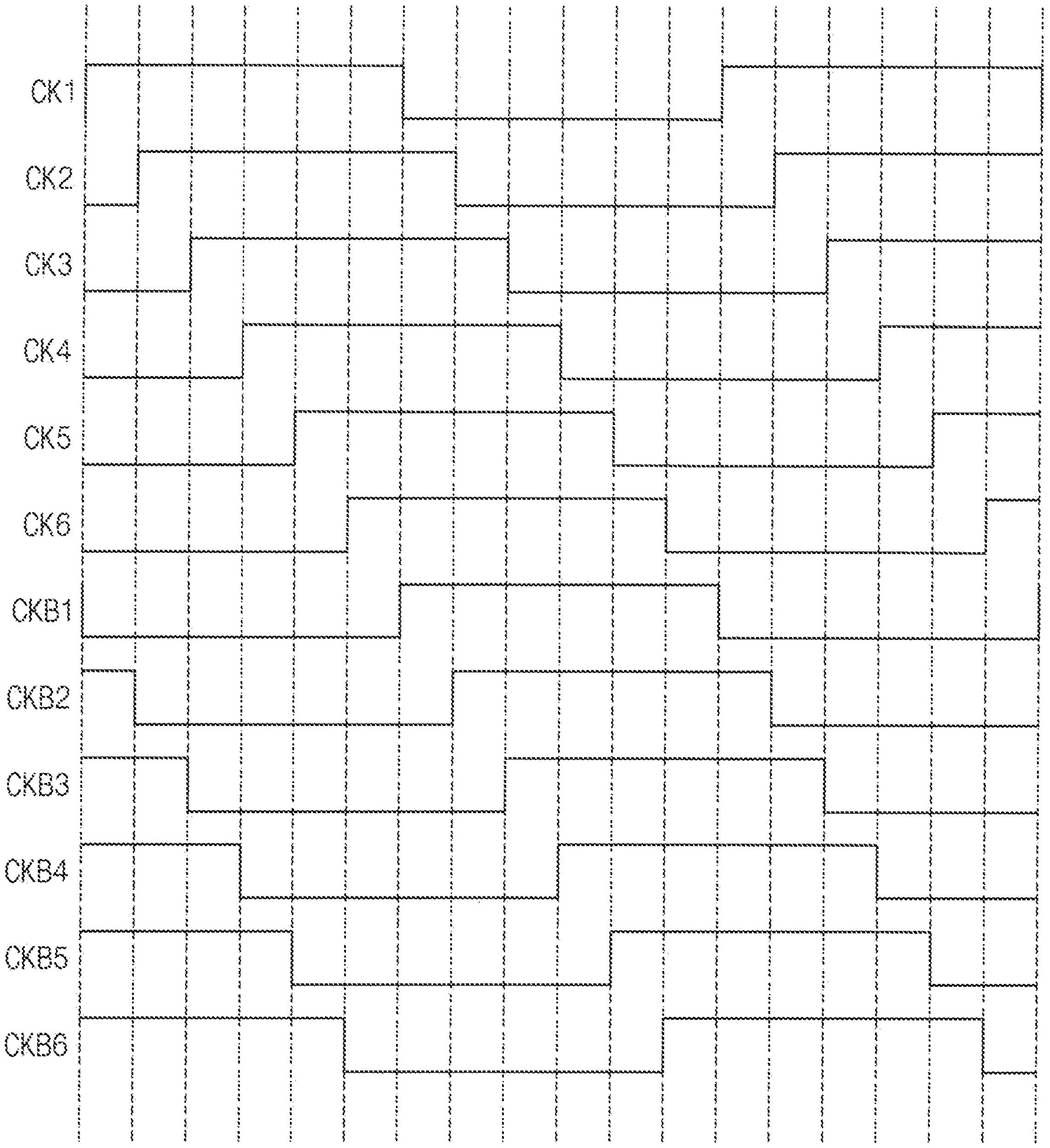
FIG. 4 is a timing diagram illustrating a clock timing signals applied to the gate driver of FIG. 1.

FIG. 3 is a block diagram illustrating an end portion of the gate driver 300 of FIG. 1. FIG. 4 is a timing diagram illustrating a clock timing signals CK1 to CK6 and CKB1 to CKB6 applied to the gate driver 300 of FIG. 1.

Referring to FIGS. 1 to 4, first, second, third, fourth, fifth, sixth, seventh, eighth, ninth, tenth, eleventh and twelfth clock timing signals CK1 to CK6 and CKB1 to CKB6 having different phases may be applied to the gate driving circuit. The phases of the first, second, third, fourth, fifth, sixth, seventh, eighth, ninth, tenth, eleventh and twelfth clock timing signals CK1 to CK6 and CKB1 to CKB6 may be sequentially activated at the same interval.

As shown in FIG. 4, the second clock timing signal CK2 may have a phase slower by 1/12 than a phase of the first clock timing signal CK1. The third clock timing signal CK3 may have a phase slower by 1/12 than the phase of the second clock timing signal CK2. The fourth clock timing signal CK4 may have a phase slower by 1/12 than the phase of the third clock timing signal CK3. The fifth clock timing signal CK5 may have a phase slower by 1/12 than the phase of the fourth clock timing signal CK4. The sixth clock timing signal CK6 may have a phase slower by 1/12 than the phase of the fifth clock timing signal CK5. The seventh clock timing signal CK7 may have a phase slower by 1/12 than the phase of the sixth clock timing signal CK6. The eighth clock timing signal CK8 may have a phase slower by 1/12 than the phase of the seventh clock timing signal CK7. The ninth clock timing signal CK9 may have a phase slower by 1/12 than the phase of the eighth clock timing signal CK8. The tenth clock timing signal CK10 may have a phase slower by 1/12 than the phase of the ninth clock timing signal CK9. The eleventh clock timing signal CK11 may have a phase slower by 1/12 than the phase of the tenth clock timing signal CK10. The twelfth clock timing signal CK12 may have a phase slower by 1/12 than the phase of the eleventh clock timing signal CK11.

The seventh to twelfth clock timing signals CKB1 to CKB6 may be inversion signals of the first to sixth clock timing signals CK1 to CK6.

ASTCK1 to ASTCKB6 in FIG. 3 may be twelve active stages disposed at a lower end portion of the gate driver 300. The first to twelfth clock timing signals CK1 to CKB6 may be sequentially applied to ASTCK1 to ASTCKB6.

In the present example embodiment, the gate driving circuit may include a first dummy stage DSTCK2, a second dummy stage DSTCK4, a third dummy stage DSTCK6 and a fourth dummy stage DSTCKB2 each of which outputs the carry signals to two active stages, respectively.

The first dummy stage DSTCK2 may output a first dummy carry signal generated in response to the second clock timing signal CK2 to a fifth active stage ASTCK5 receiving the fifth clock timing signal CK5 and a sixth active stage ASTCK6 receiving the sixth clock timing signal CK6. The second dummy stage DSTCK4 may output a second dummy carry signal generated in response to the fourth clock timing signal CK4 to a seventh active stage ASTCKB1 receiving the seventh clock timing signal CKB1 and an eighth active stage ASTCKB2 receiving the eighth clock timing signal CKB2. The third dummy stage DSTCK6 may output a third dummy carry signal generated in response to the sixth clock timing signal CK6 to a ninth active stage ASTCKB3 receiving the ninth clock timing signal CKB3 and a tenth active stage ASTCKB4 receiving the tenth clock timing signal CKB4. The fourth dummy stage DSTCKB2 may output a fourth dummy carry signal generated in response to the eighth clock timing signal CKB2 to an eleventh active stage ASTCKB5 receiving the eleventh clock timing signal CKB5 and a twelfth active stage ASTCKB6 receiving the twelfth clock timing signal CKB6.

Although the twelve clock timing signals having different timings are sequentially applied to the stages in the present example embodiment for convenience of explanation, the present inventive concept is not limited thereto.

Figure 5:
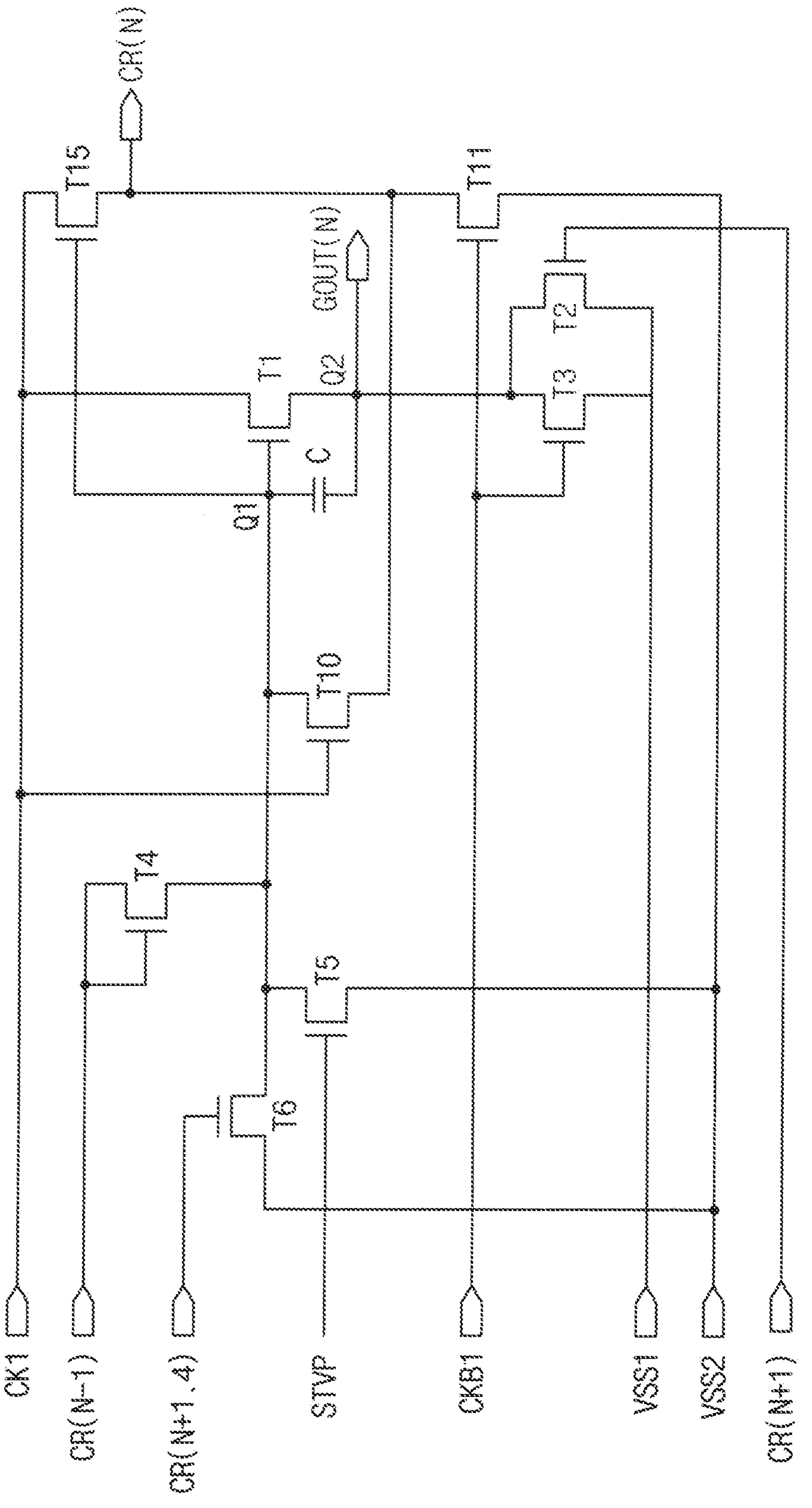
FIG. 5 is a circuit diagram illustrating an active stage of the gate driver of FIG. 1.
Figure 6:
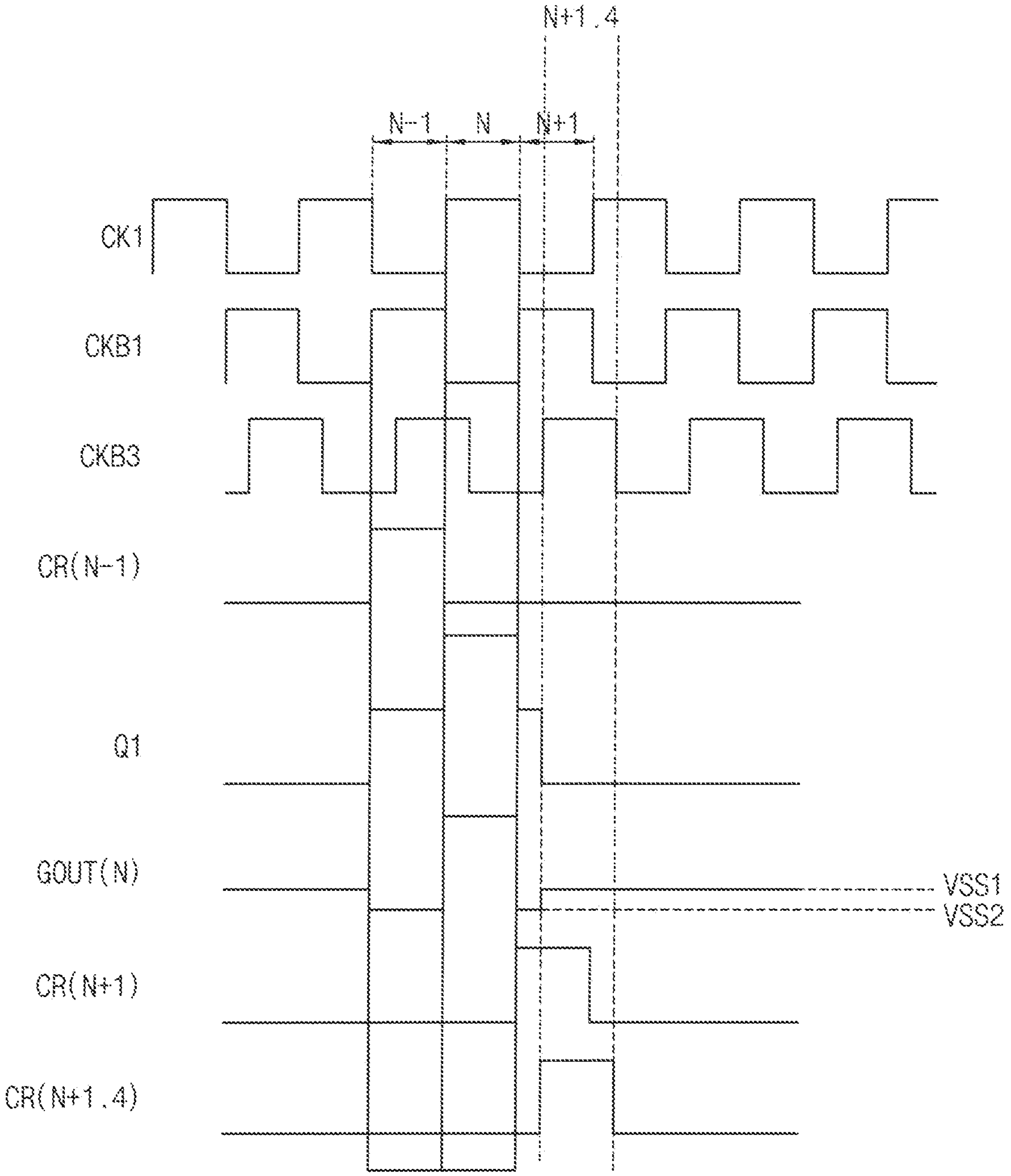
FIG. 6 is a timing diagram illustrating input signals, a node signal and output signals of the active stage of FIG. 5.

FIG. 5 is a circuit diagram illustrating an active stage of the gate driver 300 of FIG. 1. FIG. 6 is a timing diagram illustrating input signals, a node signal and output signals of the active stage of FIG. 5.

Referring to FIGS. 1 to 6, the active stages receive the clock timing signals CK1 to CKB6, a first off voltage VSS1 and a second off voltage VSS2. The gate driver 300 outputs a gate output signal GOUT(N) and a carry signal CR(N).

The clock timing signal CK1 to CKB6 has a square wave having a high level and a low level alternated with each other. The high level of the clock timing signal CK1 to CKB6 may correspond to a gate on voltage. The low level of the clock timing signal CK1 to CKB6 may correspond to the second gate off voltage VSS2. For example, the gate on voltage may be between about 15V and about 20V.

The first off voltage VSS1 may be a direct-current ("DC") voltage. The second off voltage may be a DC voltage. The second off voltage may have a level lower than a level of the first off voltage VSS1. For example, the first off voltage VSS1 may be about −5V. For example, the second off voltage VSS2 may be about −10V.

The active stage may include a pull-up control part T4, a pull-up part T1, a pull-down part T2, a carry part T15, a first holding part T6, a second holding part T3, a third holding part T10, a fourth holding part T11 and a fifth holding part T5. The active stage may further include a capacitor C.

The pull-up control part T4 applies a previous carry signal (e.g., CR(N-1)) of one of previous stages to a first node Q1 in response to the previous carry signal.

The pull-up control part T4 includes a fourth transistor T4. The fourth transistor T4 includes a control electrode and an input electrode commonly connected to an (N-1)-th carry terminal, and an output electrode connected to the first node Q1.

The pull-up part T1 outputs a first clock signal (e.g., CK1) as an N-th gate signal GOUT(N) in response to a signal applied to the first node Q1.

The pull-up part T1 includes a first transistor T1. The first transistor T1 includes a control electrode connected to the first node Q1, an input electrode connected to a first clock terminal and an output electrode connected to a gate output terminal.

The capacitor C includes a first electrode connected to the first node Q1 and a second electrode connected to the gate output terminal.

The pull-down part T2 pulls down the N-th gate signal GOUT(N) to the first off voltage VSS1 in response to a first next carry signal (e.g., CR(N+1)) of one of next stages.

The pull-down part T2 includes a second transistor T2. The second transistor T2 includes a control electrode connected to an (N+1)-th carry terminal, an input electrode connected to the gate output terminal and an output electrode connected to a first off voltage terminal.

The carry part T15 outputs the first clock signal (e.g., CK1) as an N-th carry signal CR(N) in response to the signal applied to the first node Q1.

The carry part T15 includes a fifteenth transistor T15. The fifteenth transistor T15 includes a control electrode connected to the first node Q1, an input electrode connected to the first clock terminal and an output electrode connected to a carry output terminal.

The first holding part T6 pulls down the first node Q1 to the second off voltage VSS2 in response to a second next carry signal (e.g., CR(N+1.4)) of one of next stages different from the first next carry signal (e.g., CR(N+1)).

The first holding part T6 includes a sixth transistor T6. The sixth transistor T6 includes a control electrode connected to an (N+1.4)-th carry terminal, an input electrode connected to the first node Q1 and an output electrode connected to a second off voltage terminal.

The second holding part T3 pulls down the N-th gate signal GOUT(N) to the first off voltage VSS1 in response to a second clock signal (e.g., CKB1) different from the first clock signal (e.g., CK1).

The second holding part T3 includes a third transistor T3. The third transistor T3 includes a control electrode connected to a second clock terminal, an input electrode connected to the gate output terminal and an output electrode connected to the first off voltage terminal.

The third holding part T10 connects the first node Q1 to the carry output terminal in response to the first clock signal (e.g., CK1).

The third holding part T10 includes a tenth transistor T10. The tenth transistor T10 includes a control electrode connected to the first clock terminal, an input electrode connected to the first node Q1 and an output electrode connected to the carry output terminal.

The fourth holding part T11 pulls down the carry output terminal to the second off voltage VSS2 in response to the second clock signal (e.g., CKB1).

The fourth holding part T11 includes an eleventh transistor T11. The eleventh transistor T11 includes a control electrode connected to the second clock terminal, an input electrode connected to the carry output terminal and an output electrode connected to the second off voltage terminal.

The first node Q1 may be pulled down to the second off voltage VSS2 by the third holding part T10 and the fourth holding part T11.

The fifth holding part T5 pulls down the first node Q1 to the second off voltage VSS2 in response to a vertical start signal STVP.

The fifth holding part T5 includes a fifth transistor T5. The fifth transistor T5 includes a control electrode connected to a vertical start signal terminal, an input electrode connected to the first node Q1 and an output electrode connected to the second off voltage terminal.

In the present example embodiment, the first clock signal may be the first clock timing signal CK1. The second clock signal may be the seventh clock timing signal CKB1 which is the inversion signal of the first clock timing signal CK1.

The previous carry signal (e.g., CR(N−1)) may have a same timing as the seventh clock timing signal CKB1. The first next carry signal (e.g., CR(N+1)) may have a same timing as the seventh clock timing signal CKB1. The second next carry signal (e.g., CR(N+1.4)) may have a timing same as the ninth clock timing signal CKB3.

In the same way, when the first clock signal is the second clock timing signal CK2, the second clock signal may be the eighth clock timing signal CKB2, the previous carry signal and the first next carry signal may have a same timing as the eighth clock timing signal CKB2 and the second next carry signal may have a same timing as the tenth clock timing signal CKB4.

Referring to FIG. 6, the first clock signal CK1 may have a high level corresponding to an (N−2)-th stage, an N-th stage and an (N+2)-th stage. The second clock signal CKB1 which is the inversion signal of the first clock signal CK1 may have a high level corresponding to an (N−1)-th stage, an (N+1)-th stage and an (N+3)-th stage.

The previous carry signal CR(N−1) may have a high level corresponding to the (N−1)-th stage. The first next carry signal CR(N+1) may have a high level corresponding to the (N+1)-th stage. The second next carry signal CR(N+1.4) may have a high level corresponding to a late portion of the (N+1)-th stage and an early portion of the (N+2)-th stage.

The N-th gate signal GOUT(N) may be synchronized with the first clock signal CK1. The N-th gate signal GOUT(N) may have a high level corresponding to the N-th stage. The N-th carry signal CR(N) may be synchronized with the first clock signal CK1. The N-th carry signal CR(N) may have a high level corresponding to the N-th stage.

The voltage of the first node Q1 of the N-th stage may be increased to a first level by the pull-up control part T4 in response to the previous carry signal CR(N−1) and may be increased to a second level higher than the first level by the first pull-up part T1 and a coupling generated by the capacitor C in response to the first clock signal CK1. In addition, the voltage of the first node Q1 of the N-th stage may be decreased to a third level lower than the second level by the coupling generated by the capacitor C in response to the first next carry signal CR(N+1). In addition, the voltage of the first node Q1 of the N-th stage may be synchronized with a timing of the second next carry signal CR(N+1.4) and decreased to the second off-voltage (VSS2). For example, the third level may be the same as the first level.

Figure 7:
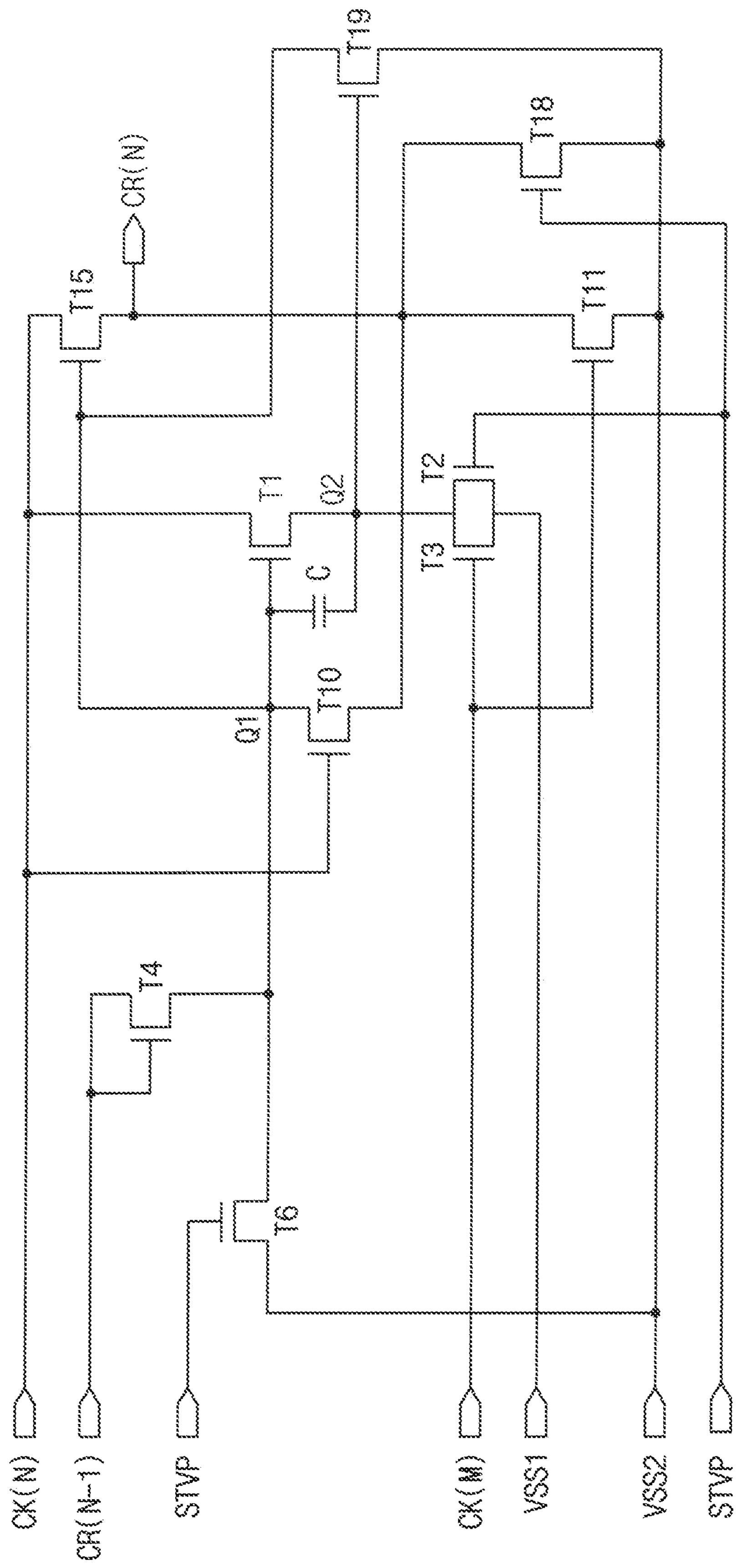
FIG. 7 is a circuit diagram illustrating a dummy stage of the gate driver of FIG. 1.
Figure 8:
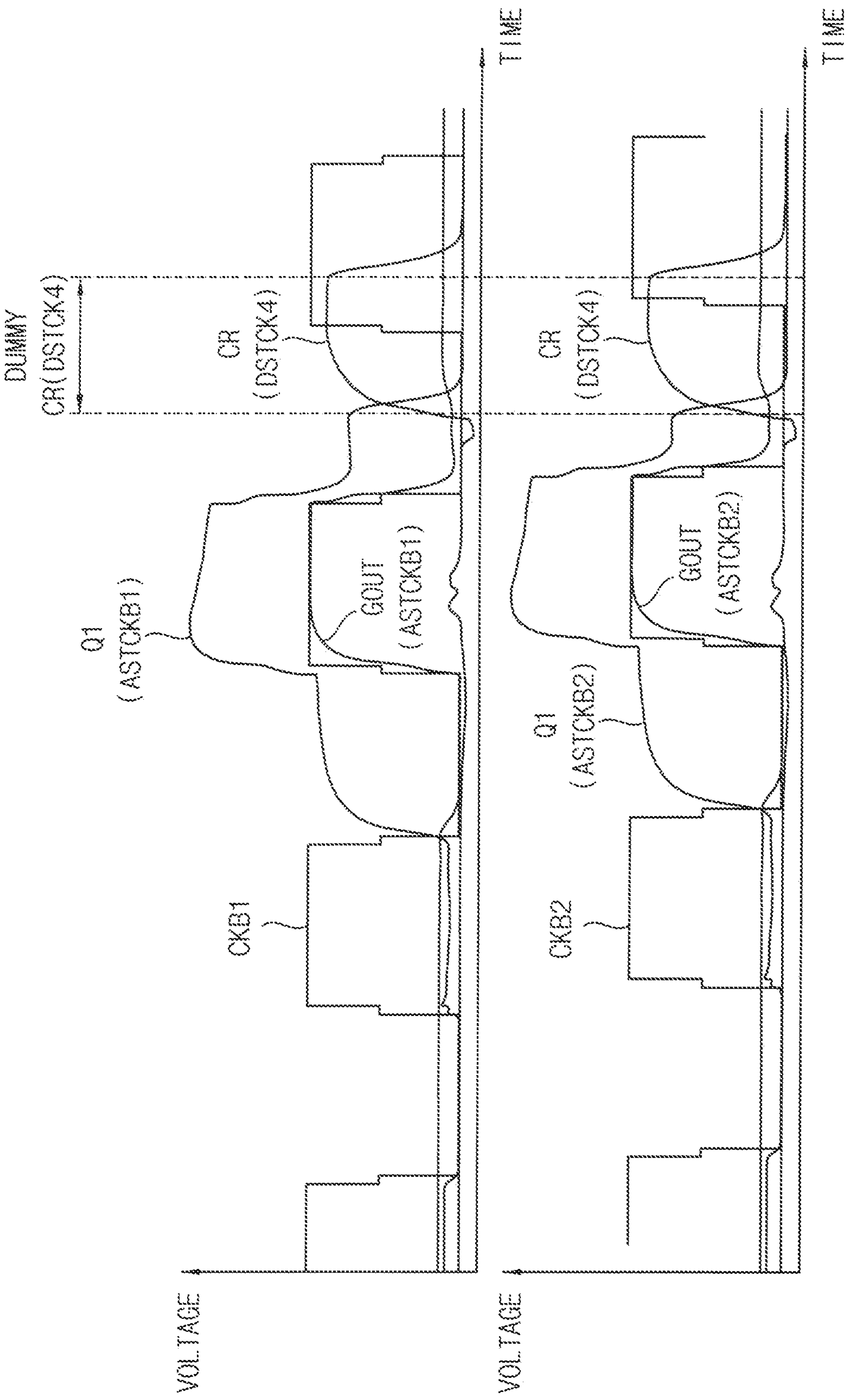
FIG. 8 is a waveform diagram illustrating input signals, node signals and output signals of two active stages which share a carry signal of a first dummy stage of FIG. 3.

FIG. 7 is a circuit diagram illustrating a dummy stage of the gate driver 300 of FIG. 1. FIG. 8 is a waveform diagram illustrating input signals, node signals and output signals of two active stages which share a carry signal from a first dummy stage of FIG. 3.

Referring to FIGS. 1 to 8, a configuration of the dummy stage of FIG. 7 may be the same as a configuration of the active stage of FIG. 5. The dummy stage of FIG. 7 may further include a carry pull-down part T18 and a self-erasing part T19. The dummy stage of FIG. 7 may not include the fifth holding part T5. The input signals applied to the transistors of the dummy stage may be different from the input signals applied to the transistors of the active stage.

The dummy stage may include a pull-up control part T4, a pull-up part T1, a pull-down part T2, a carry part T15, a first holding part T6, a second holding part T3, a third holding part T10, a fourth holding part T11, the carry pull-down part T18 and the self-erasing part T19. The dummy stage may further include a capacitor C connected between the first node Q1 and the second node Q2.

The pull-up control part T4 applies a previous carry signal (e.g., CR(N−1)) of one of previous stages to a first node Q1 in response to the previous carry signal CR(N−1).

The pull-up control part T4 includes a fourth transistor T4. The fourth transistor T4 includes a control electrode and an input electrode commonly connected to an (N−1)-th carry terminal, and an output electrode connected to the first node Q1.

The pull-up part T1 applies a first clock signal (e.g., CK(N)) to a second node Q2 in response to a signal applied to the first node Q1.

The pull-up part T1 includes a first transistor T1. The first transistor T1 includes a control electrode connected to the first node Q1, an input electrode connected to a first clock terminal and an output electrode connected to the second node Q2.

The capacitor C includes a first electrode connected to the first node Q1 and a second electrode connected to the second node Q2.

The pull-down part T2 pulls down the second node Q2 to the first off voltage VSS1 in response to a vertical start signal STVP.

The pull-down part T2 includes a second transistor T2. The second transistor T2 includes a control electrode connected to a vertical start signal terminal, an input electrode connected to the second node Q2 and an output electrode connected to a first off voltage terminal.

The carry part T15 outputs the first clock signal (e.g., CK(N)) as an N-th carry signal CR(N) in response to the signal applied to the first node Q1.

The carry part T15 includes a fifteenth transistor T15. The fifteenth transistor T15 includes a control electrode connected to the first node Q1, an input electrode connected to the first clock terminal and an output electrode connected to a carry output terminal.

The first holding part T6 pulls down the first node Q1 to the second off voltage VSS2 in response to the vertical start signal STVP.

The first holding part T6 includes a sixth transistor T6. The sixth transistor T6 includes a control electrode connected to the vertical start signal terminal, an input electrode connected to the first node Q1 and an output electrode connected to a second off voltage terminal.

The second holding part T3 pulls down the second node Q2 to the first off voltage VSS1 in response to a second clock signal (e.g., CK(M)) different from the first clock signal (e.g., CK(N)).

The second holding part T3 includes a third transistor T3. The third transistor T3 includes a control electrode connected to a second clock terminal, an input electrode connected to the second node Q2 and an output electrode connected to the first off voltage terminal.

The third holding part T10 connects the first node Q1 to the carry output terminal in response to the first clock signal (e.g., CK(N)).

The third holding part T10 includes a tenth transistor T10. The tenth transistor T10 includes a control electrode connected to the first clock terminal, an input electrode connected to the first node Q1 and an output electrode connected to the carry output terminal.

The fourth holding part T11 pulls down the carry output terminal to the second off voltage VSS2 in response to the second clock signal (e.g., CK(M)).

The fourth holding part T11 includes an eleventh transistor T11. The eleventh transistor T11 includes a control electrode connected to the second clock terminal, an input electrode connected to the carry output terminal and an output electrode connected to the second off voltage terminal.

The first node Q1 may be pulled down to the second off voltage VSS2 by the third holding part T10 and the fourth holding part T11.

The carry pull-down part T18 pulls down the carry output terminal to the second off voltage VSS2 in response to the vertical start signal STVP.

The carry pull-down part T18 includes an eighteenth transistor T18. The eighteenth transistor T18 includes a control electrode connected to the vertical start signal terminal, an input electrode connected to the carry output terminal and an output electrode connected to the second off voltage terminal.

The self-erasing part T19 pulls down the first node Q1 to the second off voltage VSS2.

In the present example embodiment, the self-erasing part T19 may pull down the first node Q1 to the second off voltage VSS2 in response to a signal of the second node Q2. The self-erasing part T19 includes a nineteenth transistor. The nineteenth transistor T19 includes a control electrode connected to the second node Q2, an input electrode connected to the first node Q1 and an output electrode connected to the second off voltage terminal.

In the present example embodiment, when the first clock signal CK(N) is the eighth clock timing signal CKB2, the second clock signal CK(M) may be the first clock timing signal CK1. In the active stage of FIG. 5, the second clock signal is the inversion signal of the first clock signal. However, in the dummy stage of FIG. 7, the second clock signal may not be the inversion signal of the first clock signal.

In the same way, when the first clock signal CK(N) is the ninth clock timing signal CKB3, the second clock signal CK(M) may be the second clock timing signal CK2.

In FIG. 8, the second dummy stage DSTCK4 may generate a second dummy carry signal CR(DSTCK4) in response to the fourth clock timing signal CK4 and output the second dummy carry signal CR(DSTCK4) to a seventh active stage ASTCKB1 receiving the seventh clock timing signal CKB1 and an eighth active stage ASTCKB2 receiving the eighth clock timing signal CKB2.

A signal of the first node of the seventh active stage ASTCKB1 is represented as Q1(ASTCKB1) and the gate signal of the seventh active stage ASTCKB1 is represented as GOUT(ASTCKB1). A signal of the first node of the eighth active stage ASTCKB2 is represented as Q1(ASTCKB2) and the gate signal of the eighth active stage ASTCKB2 is represented as GOUT(ASTCKB2).

The signal Q1(ASTCKB1) of the first node of the seventh active stage ASTCKB1 and the signal Q1(ASTCKB2) of the first node of the eighth active stage ASTCKB2 may be pulled down at the same time in response to the second dummy carry signal CR(DSTCK4).

FIG. 9 is a table illustrating examples of channel widths of transistors and capacitances of capacitors of the active stage and the dummy stage of the gate driver 300 of FIG. 1.

Referring to FIGS. 1 to 9, as explained above, the active stage may output the gate signal and the carry signal. However, the dummy stage may output the carry signal and may not output the gate signal. Thus, the channel width of the transistor of the dummy stage may be decreased and the capacitance of the capacitor of the dummy stage may be decreased.

In a left side of FIG. 9, example channel widths W1, W2, W3, W4, W6, W10, W11 and W15 of the first transistor, the second transistor, the third transistor, the fourth transistor, the sixth transistor, the tenth transistor, the eleventh transistor and the fifteenth transistor of the active stage (AST) are represented.

The channel widths W1, W2, W3, W4, W6, W10, W11 and W15 of the first transistor, the second transistor, the third transistor, the fourth transistor, the sixth transistor, the tenth transistor, the eleventh transistor and the fifteenth transistor of the active stage may be respectively 3198 um, 5330 um, 220 um, 1418 um, 700 um, 291 um, 230 um and 900 um.

In a right side of FIG. 9, example channel widths W1, W2, W3, W4, W6, W10, W11, W15, W18 and W19 of the first transistor, the second transistor, the third transistor, the fourth transistor, the sixth transistor, the tenth transistor, the eleventh transistor, the fifteenth transistor, the eighteenth transistor and the nineteenth transistor of the dummy stage (DST) are represented.

The channel widths W1, W2, W3, W4, W6, W10, W11, W15, W18 and W19 of the first transistor, the second transistor, the third transistor, the fourth transistor, the sixth transistor, the tenth transistor, the eleventh transistor, the fifteenth transistor, the eighteenth transistor and the nineteenth transistor of the dummy stage may be respectively 160 um, 100 um, 39 um, 252 um, 100 um, 52 um, 230 um, 160 um, 100 um and 15 um.

The channel widths of the transistors of the dummy stage (DST) may be set to be much less than the channel widths of the transistors of the active stage (AST) so that an area occupied by the dummy stage may be greatly reduced.

The dummy stage does not output the gate signal so that the channel width W1 of the transistor of the pull-up part T1 of the dummy stage may be set to be much less than the channel width W1 of the transistor of the pull-up part T1 of the active stage and the channel width W2 of the transistor of the pull-down part T2 of the dummy stage may be set to be much less than the channel width W2 of the transistor of the pull-down part T2 of the active stage.

In addition, the dummy stage does not output the gate signal so that the capacitance of the capacitor C of the dummy stage which is needed to maintain the level of the gate signal of the pull-up part T1 may be set to be much less than the capacitance of the capacitor C of the active stage. For example, the capacitance of the capacitor C of the active stage may be 8800 fF and the capacitance of the capacitor C of the dummy stage may be 3000 fF.

According to the present example embodiment, the dummy stage outputs the carry signal but does not output the gate signal so that the channel width of the transistor of the dummy stage may be decreased and the capacitance of the capacitor of the dummy stage may be decreased. Thus, the area occupied by the dummy stage is reduced so that the dead space of the display apparatus may be reduced. In addition, the dummy stage does not output the gate signal so that an area occupied by the gate signal wirings of the dummy stages may not be required, and accordingly the dead space of the display apparatus may be reduced.

Furthermore, the carry signal of one dummy stage may be outputted to two active stages. Since two active stages share the carry signal of the one dummy stage, the number of the dummy stages may be reduced. In this case, the fan out area of the gate lines for outputting the gate signals from the active stages to the active area of the display panel may also be reduced. Therefore, the dead space of the display apparatus may be reduced.

Figure 10:
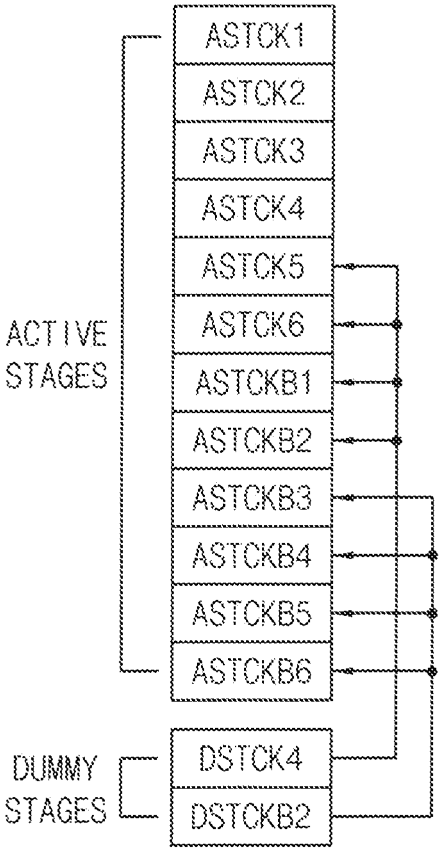
FIG. 10 is a block diagram illustrating an end portion of a gate driver of a display apparatus according to an example embodiment of the present inventive concept.

FIG. 10 is a block diagram illustrating an end portion of a gate driver of a display apparatus according to an example embodiment of the present inventive concept.

The gate driver and the display apparatus according to the present example embodiment is substantially the same as the gate driver and the display apparatus of the previous example embodiment explained referring to FIGS. 1 to 9 except for the connection structure between the active stages and the dummy stages and the configuration of the dummy stage. Thus, the same reference numerals will be used to refer to the same or like parts as those described in the previous example embodiment of FIGS. 1 to 9 and any repetitive explanation concerning the above elements will be omitted.

Referring to FIGS. 1, 2 and 4 to 10, first, second, third, fourth, fifth, sixth, seventh, eighth, ninth, tenth, eleventh and twelfth clock timing signals CK1 to CK6 and CKB1 to CKB6 having different phases may be applied to the gate driving circuit. The phases of the first, second, third, fourth, fifth, sixth, seventh, eighth, ninth, tenth, eleventh and twelfth clock timing signals CK1 to CK6 and CKB1 to CKB6 may be sequentially activated at the same interval.

ASTCK1 to ASTCKB6 in FIG. 3 may be twelve active stages disposed at a lower end portion of the gate driver 300. The first to twelfth clock timing signals CK1 to CKB6 may be sequentially applied to ASTCK1 to ASTCKB6.

In the present example embodiment, the gate driving circuit may include a first dummy stage DSTCK4 and a second dummy stage DSTCKB2 which output the carry signals to four active stages, respectively.

The first dummy stage DSTCK4 may output a first dummy carry signal generated in response to the fourth clock timing signal CK4 to a fifth active stage ASTCK5 receiving the fifth clock timing signal CK5, a sixth active stage ASTCK6 receiving the sixth clock timing signal CK6, a seventh active stage ASTCKB1 receiving the seventh clock timing signal CKB1 and an eighth active stage ASTCKB2 receiving the eighth clock timing signal CKB2.

The second dummy stage DSTCKB2 may output a second dummy carry signal generated in response to the eighth clock timing signal CKB2 to a ninth active stage ASTCKB3 receiving the ninth clock timing signal CKB3, a tenth active stage ASTCKB4 receiving the tenth clock timing signal CKB4, an eleventh active stage ASTCKB5 receiving the eleventh clock timing signal CKB5 and a twelfth active stage ASTCKB6 receiving the twelfth clock timing signal CKB6.

Although the twelve clock timing signals having different timings are sequentially applied to the stages in the present example embodiment for convenience of explanation, the present inventive concept is not limited thereto.

Figure 11:
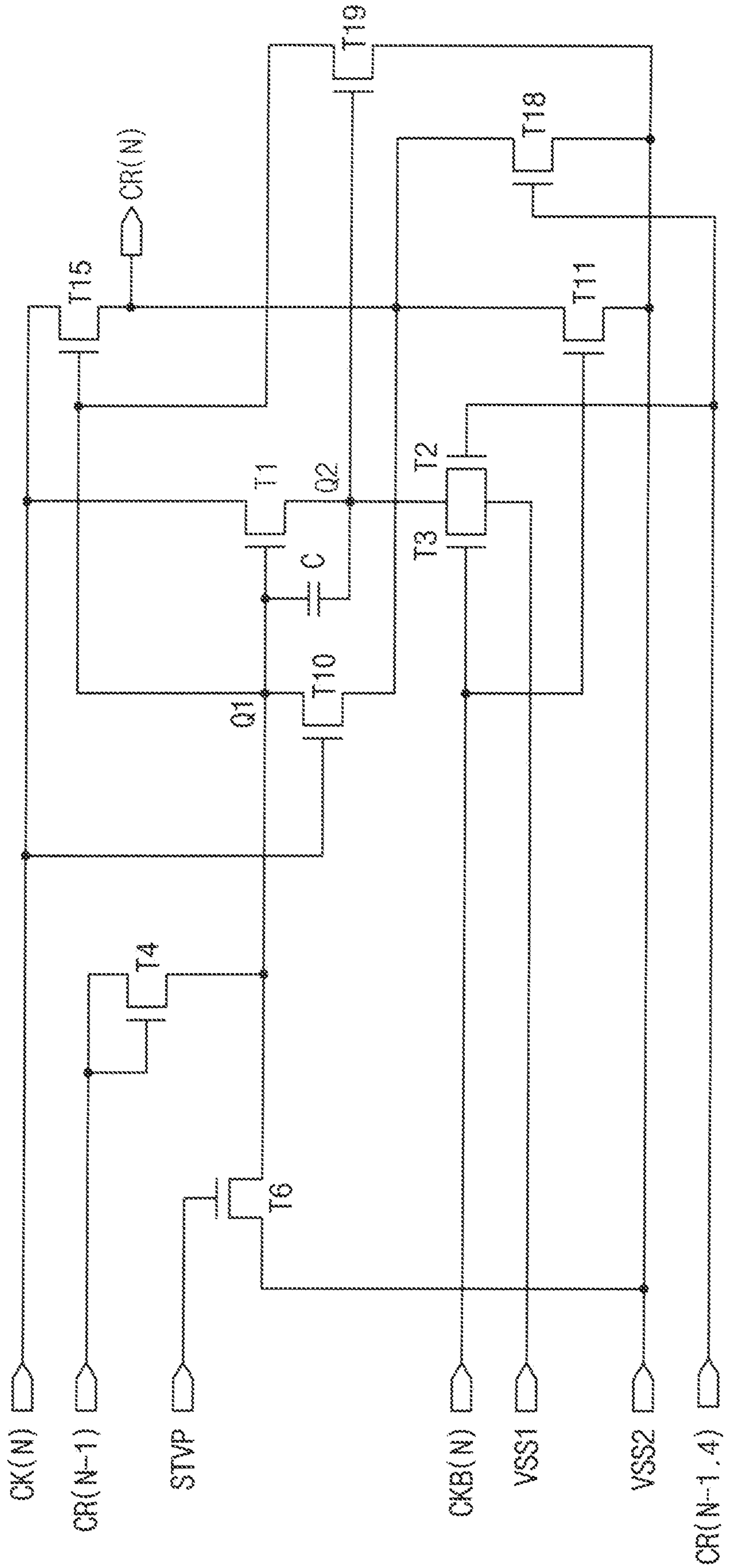
FIG. 11 is a circuit diagram illustrating a dummy stage of the gate driver of FIG. 10.
Figure 12:
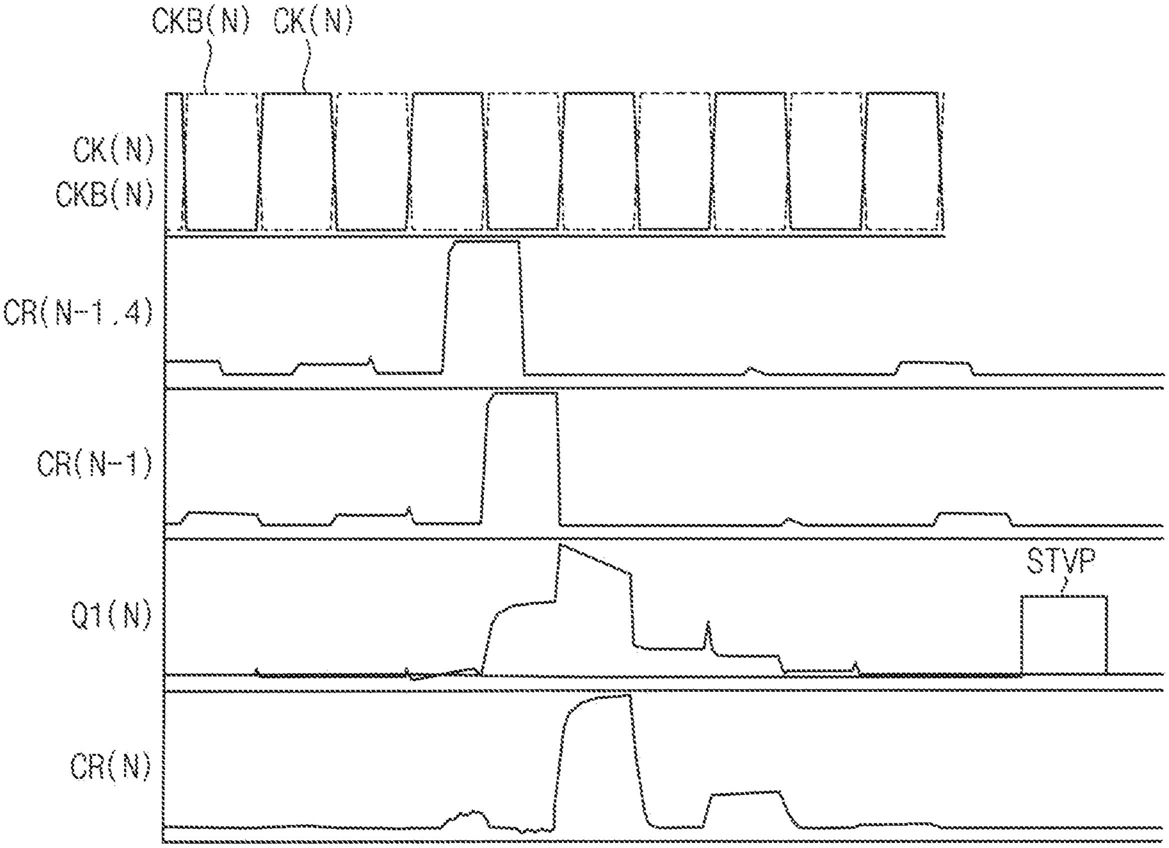
FIG. 12 is a waveform diagram illustrating input signals, a node signal and output signals of the dummy stage of FIG. 11.
Figure 13:
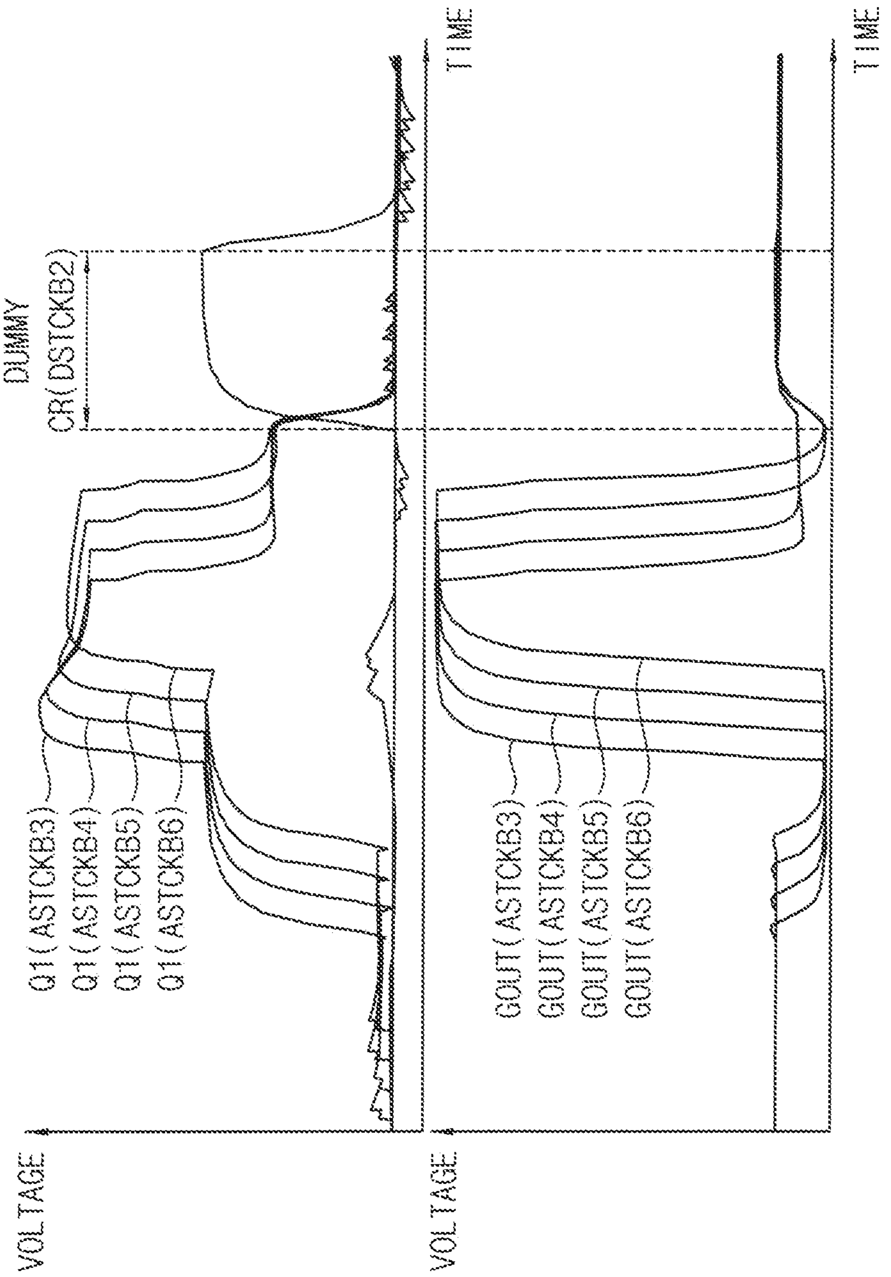
FIG. 13 is a waveform diagram illustrating node signals and output signals of four active stages which share a carry signal of a second dummy stage of FIG. 10.

FIG. 11 is a circuit diagram illustrating a dummy stage of the gate driver of FIG. 10. FIG. 12 is a waveform diagram illustrating input signals, a node signal and output signals of the dummy stage of FIG. 11. FIG. 13 is a waveform diagram illustrating node signals and output signals of four active stages which share a carry signal of a second dummy stage of FIG. 10.

Referring to FIGS. 1, 2, 4 and 10 to 13, the configuration of the active stage of the present example embodiment may be same as the configuration of the active stage of FIG. 5.

The dummy stage may include a pull-up control part T4, a pull-up part T1, a pull-down part T2, a carry part T15, a first holding part T6, a second holding part T3, a third holding part T10, a fourth holding part T11, the carry pull-down part T18 and the self-erasing part T19. The dummy stage may further include a capacitor C connected between the first node Q1 and the second node Q2.

The dummy stage of FIG. 11 may be substantially the same as the dummy stage of FIG. 7 except for the control signals of the pull-down part T2, the second holding part T3, the fourth holding part T11 and the carry pull-down part T18.

The pull-up control part T4 applies a previous carry signal (e.g., CR(N−1)) of one of previous stages to a first node Q1 in response to the previous carry signal.

The pull-up part T1 applies a first clock signal (e.g., CK(N)) to a second node Q2 in response to a signal applied to the first node Q1.

The capacitor C includes a first electrode connected to the first node Q1 and a second electrode connected to the second node Q2.

The pull-down part T2 pulls down the second node Q2 to the first off voltage VSS1 in response to a second previous carry signal (e.g., CR(N−1.4)) of one of previous stages different from a first previous carry signal (e.g., CR(N−1)) of one of previous stages.

The pull-down part T2 includes a second transistor T2. The second transistor T2 includes a control electrode connected to a second previous carry signal terminal, an input electrode connected to the second node Q2 and an output electrode connected to a first off voltage terminal.

The carry part T15 outputs the first clock signal (e.g., CK(N)) as an N-th carry signal CR(N) in response to the signal applied to the first node Q1.

The first holding part T6 pulls down the first node Q1 to the second off voltage VSS2 in response to the vertical start signal STVP.

The second holding part T3 pulls down the second node Q2 to the first off voltage VSS1 in response to a second clock signal (e.g., CKB(N)) different from the first clock signal (e.g., CK(N)).

The third holding part T10 connects the first node Q1 to the carry output terminal in response to the first clock signal (e.g., CK(N)).

The fourth holding part T11 pulls down the carry output terminal to the second off voltage VSS2 in response to the second clock signal (e.g., CKB(N)).

The carry pull-down part T18 pulls down the carry output terminal to the second off voltage VSS2 in response to the second previous carry signal (e.g., CR(N−1.4)).

The carry pull-down part T18 includes an eighteenth transistor T18. The eighteenth transistor T18 includes a control electrode connected to the second previous carry signal terminal, an input electrode connected to the carry output terminal and an output electrode connected to the second off voltage terminal.

The self-erasing part T19 pulls down the first node Q1 to the second off voltage VSS2.

In the present example embodiment, the second clock signal CKB(N) may be the inversion signal of the first clock signal CK(N).

For example, when the first clock signal CK(N) is the fourth clock timing signal CK4, the second clock signal CKB(N) may be the tenth clock timing signal CKB4, the first previous carry signal CR(N−1) may have the same phase as the tenth clock timing signal CKB4 and the second previous carry signal CR(N−1.4) may have the same phase as the seventh clock timing signal CKB1.

For example, when the first clock signal CK(N) is the eighth clock timing signal CKB2, the second clock signal CKB(N) may be the second clock timing signal CK2, the first previous carry signal CR(N−1) may have a phase same as the second clock timing signal CK2 and the second previous carry signal CR(N−1.4) may have a phase same as the eleventh clock timing signal CKB5.

In FIG. 13, the second dummy stage DSTCKB2 may generate a second dummy carry signal CR(DSTCKB2) generated in response to the eighth clock timing signal CKB2 and output the second dummy carry signal CR(DSTCKB2) to the ninth active stage ASTCKB3 receiving the ninth clock timing signal CKB3, the tenth active stage ASTCKB4 receiving the tenth clock timing signal CKB4, the eleventh active stage ASTCKB5 receiving the eleventh clock timing signal CKB5 and the twelfth active stage ASTCKB6 receiving the twelfth clock timing signal CKB6.

A signal of the first node of the ninth active stage ASTCKB3 is represented as Q1(ASTCKB3) and the gate signal of the ninth active stage ASTCKB3 is represented as GOUT(ASTCKB3). A signal of the first node of the tenth active stage ASTCKB4 is represented as Q1(ASTCKB4) and the gate signal of the tenth active stage ASTCKB4 is represented as GOUT(ASTCKB4). A signal of the first node of the eleventh active stage ASTCKB5 is represented as Q1(ASTCKB5) and the gate signal of the eleventh active stage ASTCKB5 is represented as GOUT(ASTCKB5). A signal of the first node of the twelfth active stage ASTCKB6 is represented as Q1(ASTCKB6) and the gate signal of the twelfth active stage ASTCKB6 is represented as GOUT (ASTCKB6).

The signal Q1(ASTCKB3) of the first node of the ninth active stage ASTCKB3, the signal Q1(ASTCKB4) of the first node of the tenth active stage ASTCKB4, the signal Q1(ASTCKB5) of the first node of the eleventh active stage ASTCKB5, and the signal Q1(ASTCKB6) of the first node of the twelfth active stage ASTCKB6 may be pulled down in the same timing in response to the second dummy carry signal CR(DSTCKB2).

According to the present example embodiment, the dummy stage outputs the carry signal but does not output the gate signal so that the channel width of the transistor of the dummy stage may be decreased and the capacitance of the capacitor of the dummy stage may be decreased. Thus, the area occupied by the dummy stage is reduced so that the dead space of the display apparatus may be reduced. In addition, the dummy stage does not output the gate signal so that an area for wirings for outputting the gate signals of the dummy stages may not be required, and accordingly the dead space of the display apparatus may be reduced.

Furthermore, the carry signal of one dummy stage may be outputted to four active stages. Since four active stages share the carry signal of the one dummy stage, the number of the dummy stages may be reduced. In this case, the fan out area of the gate lines for outputting the gate signals from the active stages to the active area of the display panel may also be reduced. Therefore, the dead space of the display apparatus may be reduced.

Figure 14:
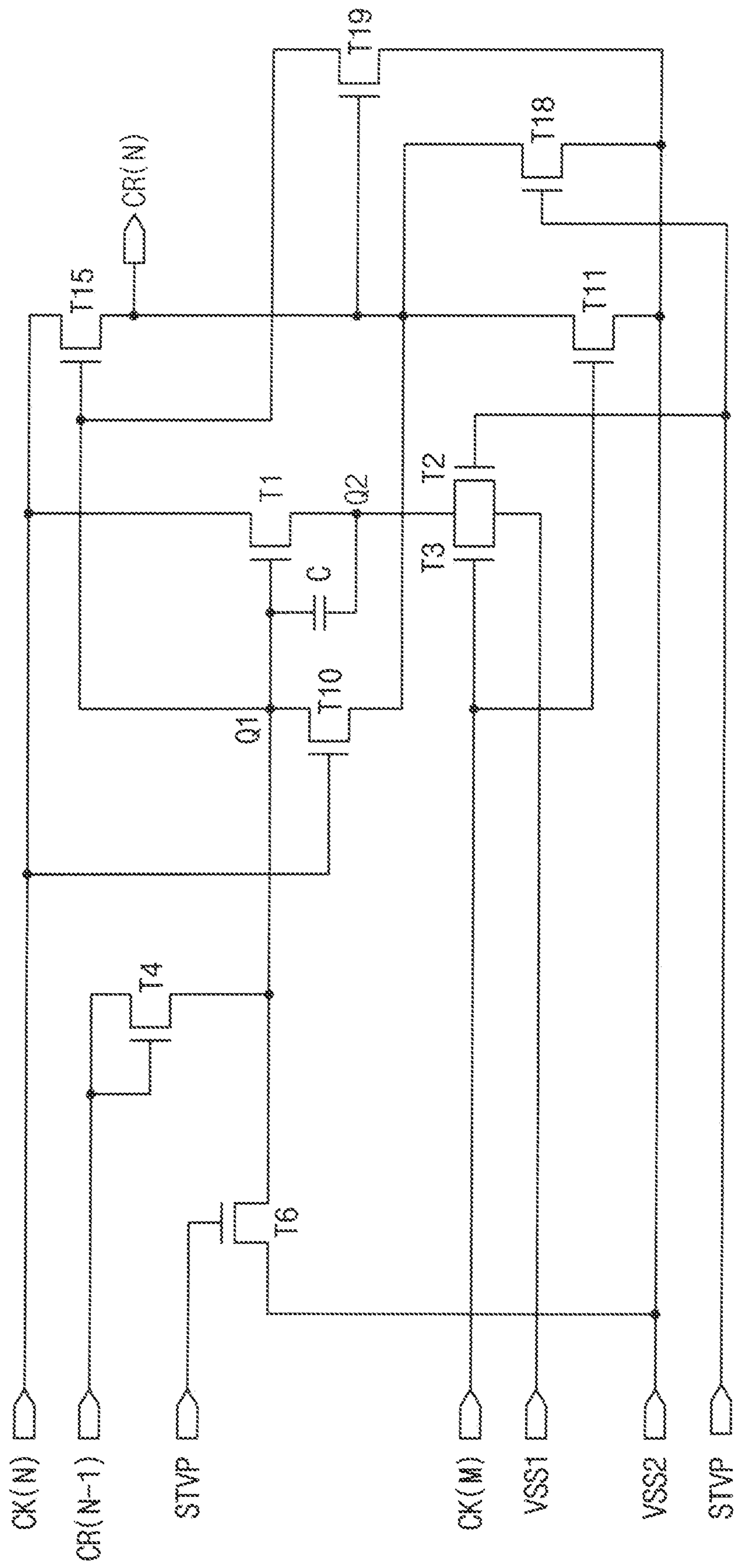
FIG. 14 is a circuit diagram illustrating a dummy stage of a gate driver of a display apparatus according to an example embodiment of the present inventive concept.

FIG. 14 is a circuit diagram illustrating a dummy stage of a gate driver of a display apparatus according to an example embodiment of the present inventive concept.

The gate driver and the display apparatus according to the present example embodiment is substantially the same as the gate driver and the display apparatus of the previous example embodiment explained referring to FIGS. 1 to 9 except for the configuration of the dummy stage. Thus, the same reference numerals will be used to refer to the same or like parts as those described in the previous example embodiment of FIGS. 1 to 9 and any repetitive explanation concerning the above elements will be omitted.

Referring to FIGS. 1 to 6, 8, 9 and 14, the configuration of the active stage of the present example embodiment may be same as the configuration of the active stage of FIG. 5.

The dummy stage may include a pull-up control part T4, a pull-up part T1, a pull-down part T2, a carry part T15, a first holding part T6, a second holding part T3, a third holding part T10, a fourth holding part T11, the carry pull-down part T18 and the self-erasing part T19. The dummy stage may further include a capacitor C connected between the first node Q1 and the second node Q2.

The dummy stage of FIG. 14 may be substantially the same as the dummy stage of FIG. 7 except for the control signal of the self-erasing part T19.

The self-erasing part T19 pulls down the first node Q1 to the second off voltage VSS2.

In the present example embodiment, the self-erasing part T19 may pull down the first node Q1 to the second off voltage VSS2 in response to a signal of the carry output terminal. The self-erasing part T19 includes a nineteenth transistor. The nineteenth transistor T19 includes a control electrode connected to the carry output terminal, an input electrode connected to the first node Q1 and an output electrode connected to the second off voltage terminal.

According to the present example embodiment, the dummy stage outputs the carry signal but does not output the gate signal so that the channel width of the transistor of the dummy stage may be decreased and the capacitance of the capacitor of the dummy stage may be decreased. Thus, the area occupied by the dummy stage is reduced so that the dead space of the display apparatus may be reduced. In addition, the dummy stage does not output the gate signal so that an area for wirings for outputting the gate signals of the dummy stages may not be required, and accordingly the dead space of the display apparatus may be reduced.

Furthermore, the carry signal of one dummy stage may be outputted to two active stages. Since two active stages share the carry signal of the one dummy stage, the number of the dummy stages may be reduced. In this case, the fan out area of the gate lines for outputting the gate signals from the active stages to the active area of the display panel may also be reduced. Therefore, the dead space of the display apparatus may be reduced.

According to the present example embodiment, the mounted area of the gate driving circuit may be reduced and the fan out area of the gate lines may be reduced so that the dead space of the display apparatus may be reduced.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims. The present inventive concept is defined by the following claims, with equivalents of the claims to be included therein.

What is claimed is:

1. A gate driving circuit comprising:
- a plurality of active stages configured to output a plurality of gate signals to a display region; and
- a plurality of dummy stages connected to respective active stages and configured to output a plurality of dummy carry signals to the respective active stages,
- wherein the plurality of active stage are configured to output the plurality of gate signals and a plurality of active carry signals, and
- wherein each of the plurality of dummy stages is configured to output a dummy carry signal to at least two active stages and not to output any gate signal.

2. The gate driving circuit of claim 1, wherein the dummy stage comprises:
- a pull-up control circuit configured to apply a previous carry signal of one of previous stages to a first node in response to the previous carry signal;
- a first holding circuit configured to pull down the first node to a second off voltage in response to a vertical start signal;
- a pull-up circuit configured to apply a first clock signal to a second node in response to a signal of the first node; and
- a pull-down circuit configured to pull down the second node to a first off voltage in response to the vertical start signal.

3. The gate driving circuit of claim 2, wherein the dummy stage further comprises:
- a carry circuit configured to output the first clock signal as an N-th carry signal in response to the signal of the first node;
- a second holding circuit configured to pull down the second node to the first off voltage in response to a second clock signal;
- a third holding circuit configured to connect the first node to a carry output terminal in response to the first clock signal; and a fourth holding circuit configured to pull down the carry output terminal to the second off voltage in response to the second clock signal.

4. The gate driving circuit of claim 3, wherein the dummy stage further comprises:

a carry pull-down circuit configured to pull down the carry output terminal to the second off voltage in response to the vertical start signal; and a self-erasing circuit configured to pull down the first node to the second off voltage.

5. The gate driving circuit of claim 4, wherein a control electrode of the self-erasing circuit is connected to the second node.

6. The gate driving circuit of claim 4, wherein a control electrode of the self-erasing circuit is connected to the carry output terminal.

7. The gate driving circuit of claim 4, wherein first, second, third, fourth, fifth, sixth, seventh, eighth, ninth, tenth, eleventh and twelfth clock timing signals having different phases are applied to the gate driving circuit, wherein the first, second, third, fourth, fifth, sixth, seventh, eighth, ninth, tenth, eleventh and twelfth clock timing signals are sequentially activated at a same interval, and wherein, when the first clock signal is the eighth clock timing signal, the second clock signal is the first clock timing signal.

8. The gate driving circuit of claim 1, wherein the dummy stage comprises:

a pull-up control circuit configured to apply a first previous carry signal of one of previous stages to a first node in response to the first previous carry signal;

a first holding circuit configured to pull down the first node to a second off voltage in response to a vertical start signal;

a pull-up circuit configured to apply a first clock signal to a second node in response to a signal of the first node; and a pull-down circuit configured to pull down the second node to a first off voltage in response to a second previous carry signal of one of previous stages, the second previous carry signal being different from the first previous carry signal.

9. The gate driving circuit of claim 8, wherein the dummy stage further comprises:

a carry circuit configured to output the first clock signal as an N-th carry signal in response to the signal of the first node;

a second holding circuit configured to pull down the second node to the first off voltage in response to a second clock signal;

a third holding circuit configured to connect the first node to a carry output terminal in response to the first clock signal; and a fourth holding circuit configured to pull down the carry output terminal to the second off voltage in response to the second clock signal.

10. The gate driving circuit of claim 9, wherein the dummy stage further comprises:

a carry pull-down circuit configured to pull down the carry output terminal to the second off voltage in response to the second previous carry signal; and a self-erasing circuit configured to pull down the first node to the second off voltage.

11. The gate driving circuit of claim 9, wherein first, second, third, fourth, fifth, sixth, seventh, eighth, ninth, tenth, eleventh and twelfth clock timing signals having different phases are applied to the gate driving circuit, wherein the phases of the first, second, third, fourth, fifth, sixth, seventh, eighth, ninth, tenth, eleventh and twelfth clock timing signals are sequentially activated at a same interval, and wherein when the first clock signal is the fourth clock timing signal, the second clock signal is the tenth clock timing signal, the first previous carry signal has a same phase as the tenth clock timing signal and the second previous carry signal has a same phase as the seventh clock timing signal.

12. The gate driving circuit of claim 1, wherein the active stage comprises an active pull-up circuit configured to output an active clock signal as an N-th gate signal and an active pull-down circuit configured to pull down a gate output terminal to a first off voltage in response to a carry signal of one of next stages, wherein the dummy stage comprises a dummy pull-up circuit configured to apply a dummy clock signal to a second node and a dummy pull-down circuit configured to pull down the second node to a first off voltage in response to a vertical start signal, wherein a channel width of a transistor of the dummy pull-up circuit is less than a channel width of a transistor of the active pull-up circuit, and wherein a channel width of a transistor of the dummy pull-down circuit is less than a channel width of a transistor of the active pull-down circuit.

13. The gate driving circuit of claim 12, wherein the active stage further comprises an active capacitor connected to a control electrode of the active pull-up circuit and an output electrode of the active pull-up circuit, wherein the dummy stage further comprises a dummy capacitor connected to a control electrode of the dummy pull-up circuit and an output electrode of the dummy pull-up circuit, and wherein a capacitance of the dummy capacitor is less than a capacitance of the active capacitor.

14. A gate driving circuit comprising:

a plurality of active stages configured to output a plurality of gate signals to a display region; and a plurality of dummy stages connected to respective active stages and configured to output carry signals to the respective active stages, wherein each of the plurality of dummy stages is configured to output a dummy carry signal to at least two active stages.

15. The gate driving circuit of claim 14, wherein the gate driving circuit comprises a first dummy stage configured to output a carry signal to two active stages, a second dummy stage configured to output a carry signal to two active stages, a third dummy stage configured to output a carry signal to two active stages and a fourth dummy stage configured to output a carry signal to two active stages.

16. The gate driving circuit of claim 15, wherein first, second, third, fourth, fifth, sixth, seventh, eighth, ninth, tenth, eleventh and twelfth clock timing signals having different phases are applied to the gate driving circuit, wherein the phases of the first, second, third, fourth, fifth, sixth, seventh, eighth, ninth, tenth, eleventh and twelfth clock timing signals are sequentially activated at a same interval, wherein the first dummy stage is configured to generate a first dummy carry signal in response to the second clock timing signal and output the first dummy carry signal to a fifth active stage receiving the fifth clock timing signal and a sixth active stage receiving the sixth clock timing signal, wherein the second dummy stage is configured to generate a second dummy carry signal in response to the fourth clock timing signal and output the second dummy carry signal to a seventh active stage receiving the seventh clock timing signal and an eighth active stage receiving the eighth clock timing signal, wherein the third dummy stage is configured to generate a third dummy carry signal in response to the sixth clock timing signal and output the third dummy carry signal to a ninth active stage receiving the ninth clock timing signal and a tenth active stage receiving the tenth clock timing signal, and wherein the fourth dummy stage is configured to generate a fourth dummy carry signal in response to the eighth clock timing signal and output the fourth dummy carry signal to an eleventh active stage receiving the eleventh clock timing signal and a twelfth active stage receiving the twelfth clock timing signal.

17. The gate driving circuit of claim 14, wherein the gate driving circuit comprises a first dummy stage configured to output a carry signal to four active stages and a second dummy stage configured to output a carry signal to four active stages.

18. The gate driving circuit of claim 17, wherein first, second, third, fourth, fifth, sixth, seventh, eighth, ninth, tenth, eleventh and twelfth clock timing signals having different phases are applied to the gate driving circuit, wherein the phases of the first, second, third, fourth, fifth, sixth, seventh, eighth, ninth, tenth, eleventh and twelfth clock timing signals are sequentially activated at a same interval, wherein the first dummy stage is configured to generate a first dummy carry signal in response to the fourth clock timing signal and output the first dummy carry signal to a fifth active stage receiving the fifth clock timing signal, a sixth active stage receiving the sixth clock timing signal, a seventh active stage receiving the seventh clock timing signal and an eighth active stage receiving the eighth clock timing signal, and wherein the second dummy stage is configured to generate a second dummy carry signal in response to the eighth clock timing signal and output the second dummy carry signal to a ninth active stage receiving the ninth clock timing signal, a tenth active stage receiving the tenth clock timing signal, an eleventh active stage receiving the eleventh clock timing signal and a twelfth active stage receiving the twelfth clock timing signal.

19. A display apparatus comprising:

a display panel comprising a display region configured to display an image and a peripheral region disposed adjacent to the display region;

a data driving circuit configured to apply a data voltage to the display panel; and a gate driving circuit comprising:

a plurality of active stages configured to output a plurality of gate signals to the display region; and a plurality of dummy stages connected to respective active stages and configured to output a plurality of dummy carry signals to the respective active stages, wherein the plurality of active stages are configured to output the plurality of gate signals and a plurality of active carry signals, and wherein each of the plurality of dummy stages is configured to output a dummy carry signal to at least two active stages and not to output any gate signal.

* * * * *